United States Patent

[11] 3,601,901

| [72] | Inventor | Earl L. Rader<br>154 W. Providencia, Burbank, Calif. 91502 |
|---|---|---|
| [21] | Appl. No. | 857,364 |
| [22] | Filed | Sept. 12, 1969 |
| [45] | Patented | Aug. 31, 1971 |

[54] FREEZE DRYING APPARATUS WITH REMOVABLE CONVEYOR AND HEATER STRUCTURES
10 Claims, 8 Drawing Figs.

[52] U.S. Cl. ...................................... 34/92,
34/85, 62/303, F26b/5/04
[50] Field of Search ........................................ 62/303;
34/92, 5, 85

[56] References Cited
UNITED STATES PATENTS
2,551,981  5/1951  Thompson....................  198/45

| 3,266,169 | 8/1966 | Smith, Jr. .................... | 34/92 |
| 3,494,140 | 2/1970 | Harper et al................. | 62/303 |

Primary Examiner—Frederick L. Matteson
Assistant Examiner—Ronald C. Capossela
Attorney—William P. Green ABSTRACT: A freeze drying machine in which particles in frozen condition are advanced along a predetermined drying path within a vacuum chamber by a conveyor, with heaters being provided along the path for drying the particles while they remain in frozen condition, and with the conveyor being mounted for bodily sliding movement as a unit from the vacuum chamber for repair or cleaning. The heater elements are desirably mounted to the frame of the removable conveyor unit, for removal therewith, and in a manner allowing separation of the heater structure from the conveyor after both have been withdrawn from the vacuum chamber.

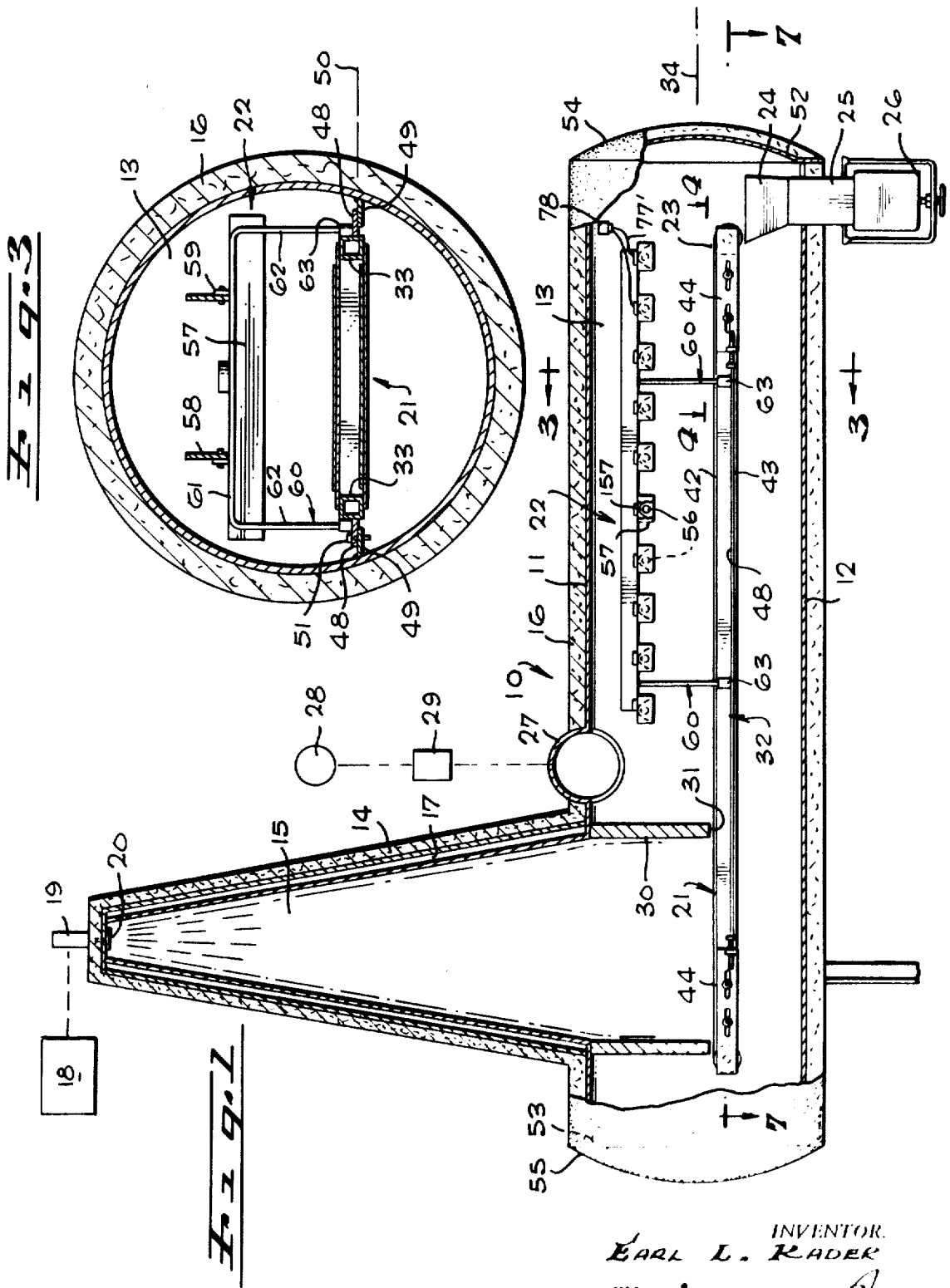

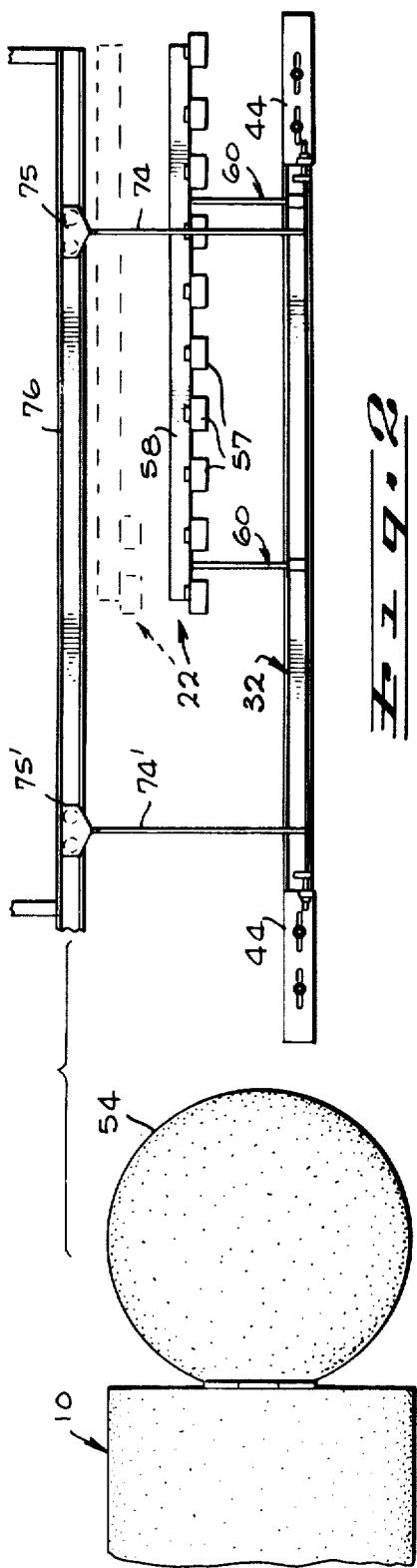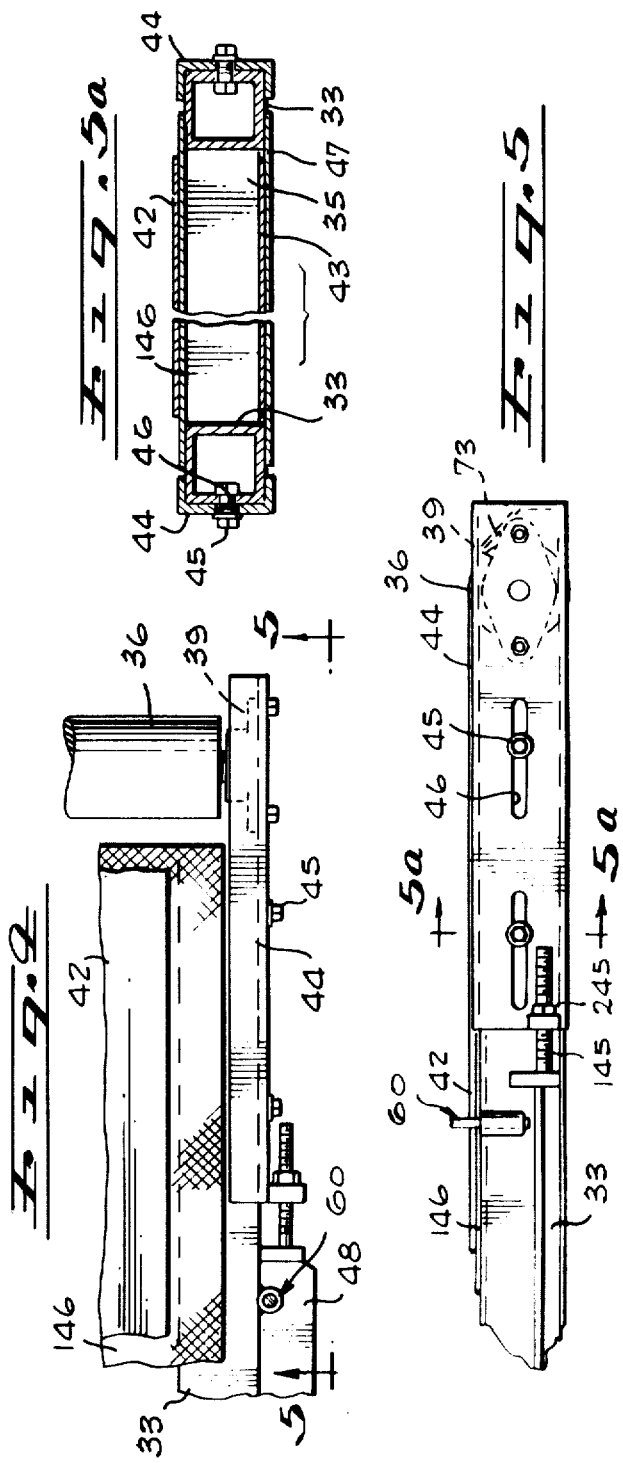

EARL L. RADER
INVENTOR.

BY William P. Green
ATTORNEY

FREEZE DRYING APPARATUS WITH REMOVABLE CONVEYOR AND HEATER STRUCTURES

CROSS-REFERENCE TO RELATED APPLICATIONS

Certain features of the apparatus disclosed in the present application have been shown and claimed in my prior applications Ser. No. 801,383, filed Feb. 24, 1969 entitled "Apparatus And Processes For Producing Freeze Dried Products" and Ser. No. 801,411, filed Feb. 24, 1969 entitled "Sealed Drive System."

BACKGROUND OF THE INVENTION

This invention relates to improved freeze drying apparatus, of a type capable of functioning continuously to receive an input substance at a predetermined location and progressively advance the substance along a predetermined treatment path for conversion to a desired freeze dried condition prior to arrival of the substance at a discharge location.

In my above-mentioned related application, I have disclosed a highly effective type of continuously operating, nonbatch-type freeze drying machine. This machine of my prior applications includes a conveyor which advances frozen particles progressively along a drying path and past a series of heater elements, to progressively sublimate moisture from the particles, and convert them to a completely freeze dried condition by the time they arrive at a discharge end of the conveyor. The conveyor is contained within a vacuum chamber from which the sublimated moisture is withdrawn. The frozen particles may be formed in the vacuum itself, desirably by spraying a liquid into a freezing portion of the chamber, under conditions causing the liquid to convert to solid frozen particulate form, with the particles then falling downwardly onto an end of the conveyor, for movement thereby through the drying zone.

SUMMARY OF THE INVENTION

The present invention provides improvements on the above-discussed type of apparatus, and particularly improvements greatly facilitating cleaning and repair of the equipment when necessary. Specifically, in a machine incorporating the features of the present invention, the conveyor for advancing the particles through the drying zone is mounted for very easy bodily removal from the vacuum chamber, through the access opening at one end of the vacuum chamber, and to its exterior. The conveyor may be supported in the vacuum chamber in a manner enabling its horizontal sliding movement longitudinally of the chamber and from its end. For best results, the conveyor includes a frame movably mounting spaced rollers on which an endless belt is carried, with the frame being supported for the desired horizontal sliding movement from the vacuum chamber and with the carried rollers and belt.

To further facilitate removal of the equipment for repair, and for cleaning of the removed parts and the interior of the vacuum chamber, the hater elements for drying the frozen particles are also preferably mounted to the conveyor unit for removal therewith from the vacuum chamber, and are desirably easily separable from the conveyor unit after such removal.

BRIEF DESCRIPTION OF THE DRAWINGS

The above and other features and objects of the invention will be better understood from the following detailed description of the typical embodiment illustrated in the accompanying drawings, in which:

FIG. 1 is a vertical section through a freeze drying machine constructed in accordance with the invention;

FIG. 2 is a view similarly showing the conveyor and heater mechanism removed from the vacuum chamber for cleaning or repair;

FIG. 3 is an enlarged transverse vertical section taken on line 3—3 of FIG. 1;

FIG. 4 is an enlarged fragmentary horizontal section taken on line 4—4 of FIG. 1;

FIG. 5 is a fragmentary side view taken on line 5—5 of FIG. 4;

FIG. 5a is a vertical section taken on line 5a—5a of FIG. 5;

DESCRIPTION OF THE PREFERRED EMBODIMENT

Figure 6:
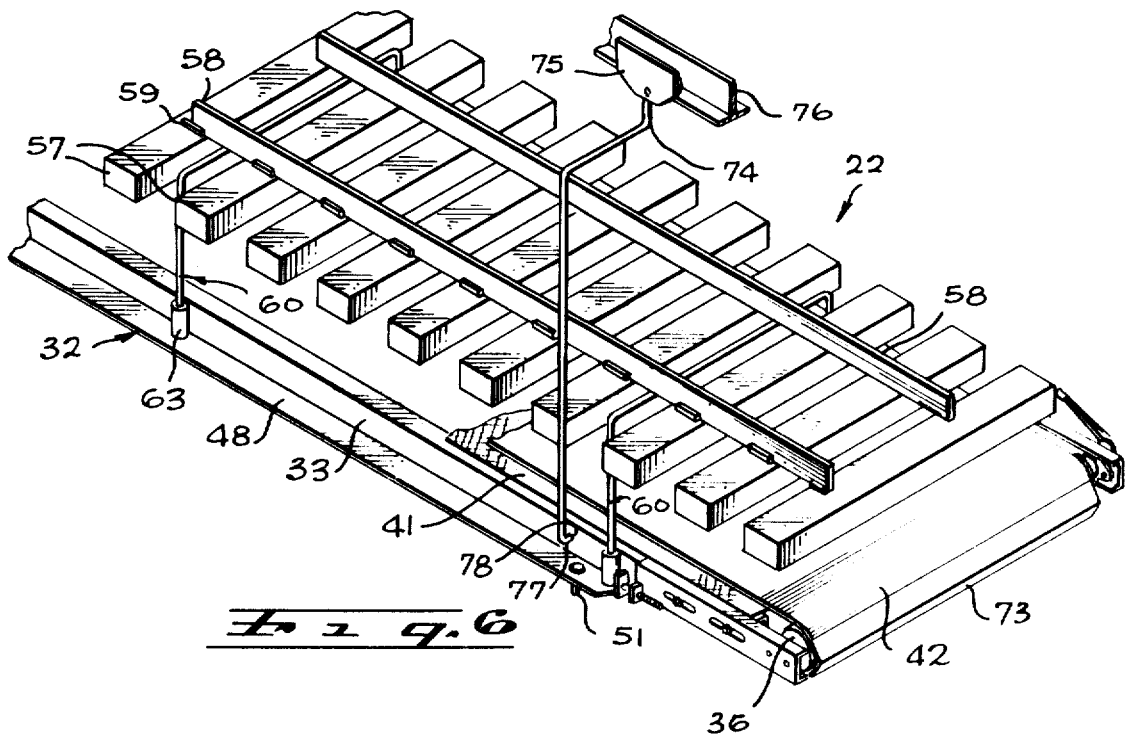
FIG. 6 is a fragmentary perspective view showing the conveyor and heater structures partially removed from the vacuum chamber.

Referring first to FIG. 1, the freeze drying machine 10 of that figure includes a vacuum chamber 11 having a horizontally extending and horizontally elongated cylindrical portion 12 defining a drying compartment 13, and an upwardly projecting portion 14 defining and containing a freezing compartment 15. The walls of both of the horizontally extending and upwardly projection portions of the chamber 11 are heat insulated as indicated at 16, and the sidewalls of upwardly projecting portion 14 are refrigerated, as by flow of a low temperature refrigerated coolant through passages 17 formed in the sidewall of upstanding portion 14 of the vacuum chamber.

A liquid to be freeze dried, such as a concentrated coffee solution or the like, is delivered from a supply tank 18 to a pump 19 which forces the liquid under pressure through a spray nozzle 20 at the top of upwardly projecting portion 14 of the vacuum chamber, to thereby spray the liquid downwardly into the interior of freezing compartment 15, within which the liquid is rapidly frozen to the form of a large number of small frozen particles, which fall downwardly within compartment 15 and onto the left end of a conveyor assembly 21. This conveyor assembly advances the particles progressively to the right of FIG. 1, beneath the past a heater assembly 22, which delivers radiant heat energy to the particles at a rate sublimating the moisture from the particles while they remain in frozen or solid condition, so that by the time the particles reach the discharge end 23 of the conveyor, they are in freeze dried form, desirably at substantially ambient temperature, to fall downwardly into a discharge hopper 24 and through a sealed outlet valve structure 25 into a collection receptacle 26 which is maintained under the same vacuum as main chamber 11. The sublimated moisture is withdrawn from compartment 13 through an outlet tube 27 connected tangentially into the upper side of the horizontal cylindrical portion 12 of the vacuum chamber, with this moisture being withdrawn by a vacuum pump 28 through a moisture accumulation chamber diagrammatically represented at 29 within which the moisture is frozen to prevent its passage to the vacuum pump. A vertically extending protective shield 30 extends downwardly from the lower end of freezing portion 14 of the vacuum chamber, to a bottom edge 31 received closely adjacent but spaced from the upper surface of conveyor assembly 21, to prevent excessive convective flow of gases or vapors between the freezing and drying compartments.

Figure 7:
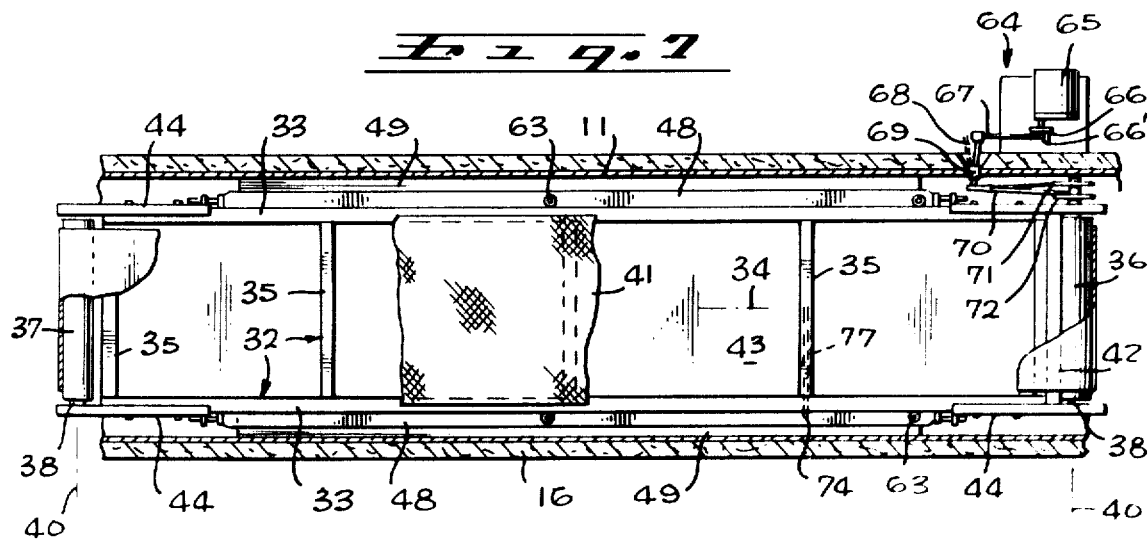
FIG. 7 is a horizontal section taken on line 7—7 of FIG. 1.

Conveyor assembly 21 includes a main rigid horizontally extending frame 32 (FIG. 7), which may be formed of two parallel elongated horizontally extending rigid frame elements 33 disposed parallel to the horizontal axis 34 of cylindrical portion 12 of the vacuum chamber. These two frame elements 33 may be formed of tubing having a square cross section, as seen in the figures. In addition to elements 33, main frame 32 of the conveyor assembly preferably includes a number of rigid horizontal cross braces 35 interconnecting elements 33 and welded or otherwise secured thereto, and disposed transversely of axis 34.

At opposite ends of frame 32, there are rotatably mounted two elongated cylindrical rollers 36 and 37, carried by shafts 38 appropriately journaled in bearings 39 for rotation about two spaced parallel horizontal axes 40 extending transversely of cylindrical portion 12 of the vacuum chamber. The two rollers 36 and 37 mount an endless conveyor belt 41 for movement along an endless path, with the belt having an upper run 42 advancing rightwardly in FIG. 1, and having a lower return run 43' moving to the left in FIG. 1. The belt is formed of a suitable flexible material for appropriately supporting the frozen particles on its upper surface, without sticking of the particles to the belt, and without adverse reaction to the temperature, vacuum and other conditions encountered in the equipment. A presently preferred material for use in forming belt 41 is a suitable fiberglass reinforced Teflon (tetrafluoroethylene polymer), or another suitable resinous plastic material, or metal if desired.

To mount the rollers for their desired rotation about axes 40, and also for bodily shifting movement in a direction to adjust the tightness of the belt, the bearings 39 which support the rollers may be mounted adjustably by four members 44, which typically have the channel-shaped vertical cross section illustrated in FIG. 5a, to fit closely about the outer sides of main frame elements 33, and which are shiftable longitudinally relative to the frame 32 by adjusting screws 145 having locking nuts 245. A plurality of additional screws 45 (FIG. 5a) extend through openings in elements 33, and through horizontally elongated slots 46 in members 44, in manner enabling the discussed longitudinal adjustment of members 44 and the carried rollers relative to frame 32. Nuts on the inner end of screws 45 are tightenable against elements 33 to assist nuts 245 in locking members 44 in any desired set position in which the belt has a desired tightness relative to the rollers. A horizontal metal screen 146 may rest on edge portions of the side elements 33 of frame 32, and on cross braces 35, to movably support upper run 42 of the belt. A similar screen 47 may be provided beneath lower run 43 of the belt, and be suitably carried by frame 32, for movably supporting lower run 43 of the belt.

Projecting laterally outwardly from the lower edges of the two main elements 33 of conveyor frame 32, there are provided two rigid flanges 48 which may be suitably welded to elements 33, and which lie in a common horizontal plane. These flanges are elongated longitudinally of the cylindrical portion 12 of the vacuum chamber, and preferably extend along the entire distance between the roller mounting member 44 at one end of the conveyor and the roller mounting members 44 at the opposite end of the conveyor. The planar undersurfaces of flanges 48 are engageable downwardly against, and supported by, two elongated horizontal mounting rails or flanges 49, whose upper surfaces lie in a common horizontal plane 50. Flanges 49 extend along opposite sides of cylindrical portion 12 of the vacuum chamber, and project inwardly from the cylindrical sidewall thereof as seen in FIG. 3, and are desirably welded continuously or otherwise rigidly secured to that metal sidewall. Flanges 49 may continue without interruption from one end of horizontal portion 12 of the vacuum chamber to its opposite end, and support flanges 48 of the conveyor assembly in a manner enabling the assembly to be slid horizontally, and rightwardly as viewed in FIGS. 1 and 2, from the vacuum chamber and to its exterior as indicated in FIG. 2. The conveyor assembly may be locked in its active FIG. 1 position within the vacuum chamber by insertion of a lockpin 51 (FIG. 3) downwardly through registering apertures in flanges 48 and 49. The supporting flanges 48 and 49 and the rest of the conveyor assembly are at a level enabling the entire assembly to be shifted rightwardly to the FIG. 2 removed position without interference being offered by the discharge hopper 24, or by shield 30, or by any of the other equipment within the vacuum chamber.

At its opposite ends, cylindrical horizontal drying portion 12 of the vacuum chamber 11 has access openings 52 and 53, which are closed by two circular doors 54 and 55 desirably of a diameter corresponding to the diameter of the cylindrical portion of the vacuum chamber. These doors may be hinged for swinging movement to an open position, such as the position of the right-hand door in FIG. 2, and are suitably sealed to the circular edges of cylindrical portion 12 of the vacuum chamber, by appropriate gaskets or he like, to maintain the proper vacuum conditions within the interior of chamber 11.

The access openings which are thus provided at the opposite ends of the chamber are consequently large enough to enable the entire conveyor assembly (and heater assembly 13 as will be later discussed) to be slid rightwardly through one of these access openings and to FIG. 2 removed position.

The heater assembly 22 includes a series of parallel horizontally extending infrared lamps 56, disposed transversely of the path of rightward advancement of the frozen particles, and therefore transversely of cylindrical portion 12 of the vacuum chamber, and positioned at horizontally spaced locations along the path of the particles to progressively dry the particles as they move rightwardly. Each of the lamps 56 may be mounted and contained within an appropriate housing 57, containing a reflector 157 which reflects the infrared radiation downwardly toward the belt and carried particles. The various lamp housings 57 may all be connected at their upper sides to a pair of parallel horizontally extending rigid elongated frame elements 58 (FIG. 6), to form with those elements 58 a rigid frame structure for the heater lamp assembly. To connect the lamp housings 57 to elements 58, each of the housings may have a pair of upstanding brackets 59 near its opposite ends which are suitably bolted or otherwise secured to elements 58.

Heater assembly 22 also includes two inverted U-shaped mounting members 60 (FIG. 3), having a horizontal portion 61 extending transversely of the cylindrical portion 12 of the vacuum chamber, with these horizontal portions being welded or otherwise rigidly secured to the two frame elements 58 of the heater assembly. At its opposite ends, each of the U-shaped members 60 has two downwardly projecting parallel vertical arms 62, which like the remainder of each element 60 may be of externally cylindrical cross section, and whose lower ends desirably project into a pair of tubular cylindrical vertical sockets 63 welded to the upper sides of flanges 48 of the conveyor assembly. Sockets 63 may be easily formed of appropriate tubing or pipe, and receive lower ends of arms 62 in closely confined and closely fitting relation, with the bottom ends of those arms extending downwardly into supported engagement with the upper surfaces of flanges 48 of the conveyor assembly, to thus effectively support the entire heater assembly 22 in the illustrated position above the conveyor assembly by means of the support arms 62.

When the conveyor assembly 21 is in the FIG. 1 installed position within the vacuum chamber, the conveyor is adapted to be driven continuously but at a relatively slow rate by a drive mechanism 64, which preferably is not removable with the conveyor and heater assemblies, and which desirably is of a type disclosed and claimed in detail in my above-mentioned copending application Ser. No. 801,411. This drive unit 64 may include an electric motor 65 located at the outside of the vacuum chamber, which motor drives a crank wheel 66 through a reduction gear and at a relatively slow rate, with a crank arm 66' being connected by a link 67 to a lever 68 which pivots about an axis 69, This lever extends through an aperture in the sidewall of the vacuum chamber, and is sealed with respect thereto, and is connected at its inner end to a link structure 70 having two arms connected to a pair of one-way clutches 71 and 72 for driving shaft 38 of one of the belt mounting rollers 36. In operation of the drive mechanism, the motor driven rotation of crank wheel 66 acts to oscillate lever 68 pivotally about axis 69 between the full line and broken line positions of FIG. 7, to thereby oscillate link 70 rightwardly and leftwardly as viewed in that figure, with the result that the two arms of link 70 actuate clutches 71 and 72 to drive roller 36 rotatably and substantially continuously. Upon a rightward movement of link 70 in FIG. 7, one of the clutches 71 or 72 acts to drive shaft 38 and the attached roller 36 through a limited angle, while the other clutch is inactive, and then on the succeeding leftward stroke of link 70 the other clutch drives shaft 38 and roller 36 in the same and continuing direction, while the originally effective clutch is inactive on that stroke. Other types of drives may of course be provided, though this illustrated arrangement as discussed in my above-mentioned prior application has certain definite advantages for the present type of apparatus.

To now describe a cycle of operation of the overall apparatus, when liquid is being forced through sprayer 20 into the upper end of the freezing compartment 15, with that compartment appropriately refrigerated, the tiny droplets of the spray rapidly freeze into solid particulate form, and in that form fall downwardly onto the left end of belt 41 of the conveyor assembly 21. They are advanced rightwardly on the upper run of that belt beneath the various heater lamps 56, to sublimate the moisture from the frozen particles and produce the desired freeze dried product in particulate form in hopper 24 and receptacle 26. To assure removal of all of the material from the belt at the discharge location, a doctor blade 73 may extend across the belt above hopper 24, in contact with the belt to scrape any adhering particles off the belt. This blade may be suitably mounted to brackets secured to two of the roller mounting members 44.

After an extended period of use, it may be desirable to clean or repair the conveyor assembly 21 and/or heater assembly 22. When this becomes desirable, the right-hand end door 54 of FIG. 1 is unlatched and swung to its open position of FIG. 2, locking pin 51 of FIG. 3 is withdrawn upwardly from the registering apertures in flanges 48 and 49, to release the parts for removal, and the entire conveyor assembly 21 and carried heater assembly 22 are pulled rightwardly toward their FIG. 2 removed positions. An operator may easily pull these parts rightwardly, as by grasping the two vertical arms 62 of one of the inverted U-shaped heater mounting elements 60. As the conveyor and heater assemblies move rightwardly, they are guided for the desired movement by sliding engagement of flanges 48 of FIG. 3 on the upper surfaces of flanges 49 provided within the vacuum chamber. When the conveyor and heater assemblies have reached a position at which they project outwardly from the vacuum chamber a short distance, the right end of frame 32 may be connected to a rigid support element or rod 74 (FIG. 6) attached at its upper end to a roller carriage 75 mounted on a track 76 extending parallel to and directly above the axis 34 of the cylindrical portion of the vacuum chamber. Support element 74 may be shaped as shown in FIG. 6, to extend first laterally to a side of the heater and conveyor assemblies, then downwardly at that side, and then inwardly to form a horizontal rigid lower portion 77. This portion 77 is typically connectable into an opening 78 in flange 48, and may project into one of the crosspieces 35 (FIG. 7) in a relation supporting the conveyor assembly from only one side but in a horizontal position. Element 74 is of a length effectively supporting the withdrawn assemblies at their original level. When these assemblies have been withdrawn further to a position in which flanges 48 have almost reached the ends of flanges 49, a second support element 74', identical with element 74 carried by a second roller carriage 75' on track 76 is connected to frame 32 at another location near its inner end, so that the entire assembly may be moved outwardly to the FIG. 2 completely removed and still horizontal position, in which the interior of the vacuum chamber is accessible for easy cleaning and repair, and the assemblies 21 and 22 are also completely accessible and exposed for cleaning. After such removal, the heater assembly 22 may be separated upwardly from conveyor assembly 21, as to the broken line position of FIG. 2, (and without interference by elements 74 and 74') to thus withdraw mounting arms 62 of the heater assembly from sockets 63, and enable the heater assembly to be moved to any desired location for repair, cleaning, or the like. Subsequently, the heater assembly may be again positioned on and connected to the conveyor assembly, and the entire combination of these parts may be slid leftwardly in FIG. 2 to their FIG. 1 fully installed positions, with the door 54 then being closed and the entire apparatus thus being ready for further use. In the FIG. 1 position, wires 77' from lamps 56 may be suitably plugged into an electrical receptacle 78 provided within the interior of the vacuum chamber, for energization thereby.

While a certain specific embodiment of the present invention has been disclosed as typical, the invention of course is not limited to this particular form, but rather is applicable broadly to all such variations as fall within the scope of the appended claims.

I claim:

1. Freeze drying apparatus comprising a vacuum chamber, sprayer means for spraying liquid in finely divided form into said chamber, means or refrigerating said chamber and freezing said sprayed liquid into frozen particles which fall downwardly within the chamber, a generally horizontally extending conveyor belt within said chamber positioned to receive said downwardly falling frozen particles and advance them generally horizontally along a predetermined drying path toward a discharge location, said chamber having an access opening at one end thereof, a closure for closing said opening in vacuum sealed relation, a frame received in said chamber and mounted for movement generally horizontally out of the chamber through said access opening when said closure is open, rotary elements mounted rotatably to said frame and engaging opposite ends of said conveyor belt to mount it for endless movement relative to said frame for advancing said particles, said belt and said rotary elements being dimensioned and constructed for removal from the chamber through said opening with said frame, powered means for driving said belt along said endless path, heater means in the chamber positioned and constructed to heat said particles and freeze dry them as they are advanced by said conveyor belt, and means mounting said heater means to said frame for removal therewith from said chamber and through said opening.

2. Freeze drying apparatus as recited in claim 1, in which said last-mentioned means include detachable connector means securing said heater means to said frame for movement therewith into and out of said chamber but enabling detachment of said heater means from the frame at the outside of the chamber.

3. Freeze drying apparatus as recited in claim 1, in which said heater means include a series of electrical heater elements positioned above said conveyor at different locations therealong.

4. Freeze drying apparatus as recited in claim 1, in which said last-mentioned means include supports for said heater means interfitting with support means on said frame and separable therefrom by upward movement of the heater means, to enable detachment of the heater means from the frame after removal therewith from said chamber.

5. Freeze drying apparatus as recited in claim 1, in which said last-mentioned means include a plurality of spaced supports for said heater means projecting downwardly into pin and socket interfitting engagement with means on said frame and separable therefrom by upward movement of the heater means, to enable detachment of the heater means from the frame and conveyor after removal therewith from said chamber.

6. Freeze drying apparatus as recited in claim 1, including tracks near opposite sides of said chamber supporting said frame for said generally horizontal movement from the chamber.

7. Freeze drying apparatus as recited in claim 1, including a suspension track at the outside of said chamber positioned to be above the frame and conveyor and heater means as they are moved horizontally from the chamber through said opening, and means movable along said track and operable to support said frame and conveyor and heater means as they move outwardly from the chamber.

8. Freeze drying apparatus as recited in claim 1, including a locking element detachably interfitting with said frame and means in said chamber in a relation releasably locking said frame against removal from the chamber.

9. Freeze drying apparatus comprising a vacuum chamber having an upwardly projecting freezing portion and a lower horizontally elongated drying portion, means for spraying a liquid downwardly into said freezing portion of the chamber and freezing it therein to a large number of frozen particles, a generally horizontally elongated and generally horizontally extending conveyor belt positioned in the chamber to receive said particles and advance them along said drying portion of the chamber toward a discharge location, rollers mounting opposite ends of said belt, a first frame carrying said rollers rotatably and thereby mounting said belt for endless movement, a drive for advancing said belt, said chamber having an access opening at one end thereof, a closure for said opening, series of electric heaters above said belt for drying said particles as they advance along the belt, a second frame above said conveyor carrying said heaters, a pair of tracks near opposite sides of the chamber supporting said first frame and mounting it for sliding movement with said rollers and belt as a unit generally horizontally from the chamber through said access opening, a plurality of inverted generally U-shaped supports connected to said second frame at spaced locations and having spaced downwardly projecting arms at opposite sides of the conveyor belt, upwardly opening sockets on said first frame at opposite sides of said conveyor belt for removably receiving said arms in a relation connecting said second frame and heater elements to the first frame for removal therewith through said opening, but enabling upward detachment of said second frame and the heater elements from said first frame at the outside of amber.

10. Freeze drying apparatus comprising a vacuum chamber, sprayer means for spraying liquid in finely divided form into said chamber, means for refrigerating said chamber and freezing said sprayed liquid into frozen particles which fall downwardly within the chamber, a generally horizontally extending conveyor belt within said chamber positioned to receive said downwardly falling frozen particles and advance them generally horizontally along a predetermined drying path toward a discharge location, said chamber having an access opening at one end thereof, a closure for closing said opening in vacuum sealed relation, a frame received in said chamber and or movement generally horizontally out of the chamber through said access opening when said closure is open, rotary elements mounted rotatably to said frame and engaging opposite ends of said conveyor belt to mount it for endless movement relative to said frame for advancing said particles, said belt and said rotary elements being dimensioned and constructed for removal from the chamber through said opening with said frame, powered means for driving said belt along said endless path, at least one suspension track extending longitudinally of said chamber at the outside thereof and positioned to be above the level of said frame and conveyor belt as they are moved horizontally from the chamber through said opening, a unit movable along said track, and means operable to suspend said frame and conveyor belt from said unit as the frame and belt move outwardly from the chamber.